United States Patent
Warke et al.

(10) Patent No.: US 7,190,665 B2
(45) Date of Patent: Mar. 13, 2007

(54) BLIND CROSSTALK CANCELLATION FOR MULTICARRIER MODULATION

(75) Inventors: Nirmal Warke, Irving, TX (US); Nadeem Ahmed, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 918 days.

(21) Appl. No.: 10/126,150

(22) Filed: Apr. 19, 2002

(65) Prior Publication Data

US 2003/0202459 A1  Oct. 30, 2003

(51) Int. Cl.
*H04J 1/12* (2006.01)
(52) U.S. Cl. ............... 370/201; 455/501; 455/63.1; 455/67.13; 455/114.2; 455/296; 375/142; 375/144
(58) Field of Classification Search ........... 370/201; 455/501–506, 63.1–65, 67.13, 114.2, 278.1, 455/296–312; 375/143–144, 147–148; 379/22.08, 379/392.01, 145, 416–417
See application file for complete search history.

(56) References Cited

U.S. PATENT DOCUMENTS

| | | | | |
|---|---|---|---|---|
| 6,631,160 B2 * | 10/2003 | Piirainen et al. | ............ | 375/231 |
| 6,804,313 B2 * | 10/2004 | Skafidas et al. | ............ | 375/350 |
| 6,920,192 B1 * | 7/2005 | Laroia et al. | ............... | 375/347 |
| 6,990,196 B2 * | 1/2006 | Zeng et al. | ................. | 379/417 |
| 7,010,069 B2 * | 3/2006 | Chugg et al. | ............... | 375/346 |
| 2002/0131479 A1 * | 9/2002 | Butler et al. | ............... | 375/147 |

OTHER PUBLICATIONS

Zeng, Chaohuang, et al., "Crosstalk Cancellation in ADSL Systems," Global Telecommunications Conference, Nov. 25-29, 2001, GLOBECOM '01 IEEE, pp. 344-348.
Zeng et al., "Crosstalk Cancellation in XDSL Systems", Committee T1 (T1E1.4 (Spectrum Management)), May 7-11, 2001.

* cited by examiner

*Primary Examiner*—Doris H. To
*Assistant Examiner*—Thai Hoang
(74) *Attorney, Agent, or Firm*—Steven A. Shaw; W. James Brady; Frederick J. Telecky, Jr.

(57) ABSTRACT

Crosstalk can be cancelled in a composite communication signal ($y_m$) which includes a primary signal component associated with communication data and which also includes a crosstalk signal component produced by applying a crosstalk coupling function to crosstalk data. An estimate (R, $R_{Cb}(0)$, $R_{Cb}(\Delta_f)_{AVG}$) of a statistical characteristic of the crosstalk signal component is obtained from the composite communication signal. A cancellation signal (26, 46) is generated based on the statistical characteristic estimate, and an estimate (29) of the communication data is produced based on the composite communication signal and the cancellation signal.

30 Claims, 4 Drawing Sheets

BLIND CROSSTALK CANCELLATION FOR MULTICARRIER MODULATION

FIELD OF THE INVENTION

The invention relates generally to electronic communication receivers and, more particularly, to electronic communication receivers in systems that exhibit crosstalk interference.

BACKGROUND OF THE INVENTION

Discrete Multitone Modulation (DMT) is a multicarrier modulation technique that provides an efficient means to handle multiple multiplexed data streams. A main motivation for using DMT for data modulation, is its ability to combat both narrowband and impulsive noise. DMT based systems have been successfully used in highspeed wired and wireless modems, and digital broadcast systems.

In DMT, the data to be transmitted over the individual subchannels are obtained via an orthogonal transformation on blocks of input data. At the receiver, the inverse transformation is used to perfectly recover the data, provided no distortion or noise was introduced within the system. In practice, the fast Fourier transform (FFT) and its inverse IFFT are used for modulation and demodulation operations.

There are many competing broadband technologies for high-speed service over the local loop. Digital Subscriber Line (DSL) technology is gaining acceptance as a viable method to meet the continually increasing demand for bandwidth. The various DSL services eliminate the need for expensive infrastructure upgrades, making it very cost effective broadband access for the huge base of installed telephones based on copper wire.

Copper twisted pairs, carrying voice and data service, are packed closely together into binders in a cable. Crosstalk, which is a significant problem especially associated with higher frequencies, results due to the proximity of these lines and significantly limits achievable bit-rates. The energy of modulated signals radiates into adjacent copper wires in the same binder. The problem is intensified when systems within the same binder transmit information over the same range of frequencies.

Some conventional crosstalk mitigation techniques use a crosstalk coupling function that is known to the ADSL receiver. Thus, estimation of crosstalk coupling functions is a critical step in such crosstalk mitigation techniques. Failure to properly identify the coupling function can lead to poor performance. In practice, estimating the crosstalk coupling function is extremely difficult, without coordination within one service (e.g. ADSL) and coordination between services (e.g. ADSL and HDSL).

It is therefore desirable to provide for crosstalk mitigation without the difficult task of reliably estimating the crosstalk coupling function.

The present invention assumes that the crosstalk coupling function is not known, and crosstalk statistics are advantageously used instead in crosstalk mitigation.

DETAILED DESCRIPTION

In many communication systems, including ADSL, performance can be severely limited by crosstalk interference. Near-end crosstalk (NEXT) is one of the major impairments due to the proximity of the interfering source. Most crosstalk cancellation schemes require precise knowledge of crosstalk coupling functions between twisted pair wires within a cable binder. The present invention exploits the fact that many crosstalk signals have large excess bandwidth and have a different symbol rate than ADSL systems. The crosstalk in the excess band can be estimated, for example, using the MMSE criterion. A crosstalk cancellation signal can then be generated to remove crosstalk from the main band. The invention advantageously removes the requirement that the crosstalk coupling function be known, and instead exploits certain crosstalk statistics which can easily be observed.

A brief description of a system model that can be used for crosstalk cancellation in DMT systems follows. The superscript "*" herein denotes a "conjugate and transpose" operation.

The received signal in the time domain can be denoted as:

$$y(t) = \sum_i a_i p(t - iT) + \sum_k b_k c(t - kT_c + \tau) + \tilde{n}(t) \qquad (1)$$

where $a_i$ and $b_k$ are the primary (DMT) and crosstalk data sequences, respectively, T is the DSL sampling period (associated with the DMT data), $T_c$ is the crosstalk symbol period, and $\tau$ is a fractional timing difference between the crosstalker and DSL system. Noise is represented by $\tilde{n}(t)$. Finally, the effective channel and crosstalk coupling functions p(t) and c(t) are:

$$p(t) = g(t) * h(t) * h_{lp}(t) \qquad (2)$$

$$c(t) = g_c(t) * h_c(t) * h_{lp}(t) \qquad (3)$$

Figure 1:
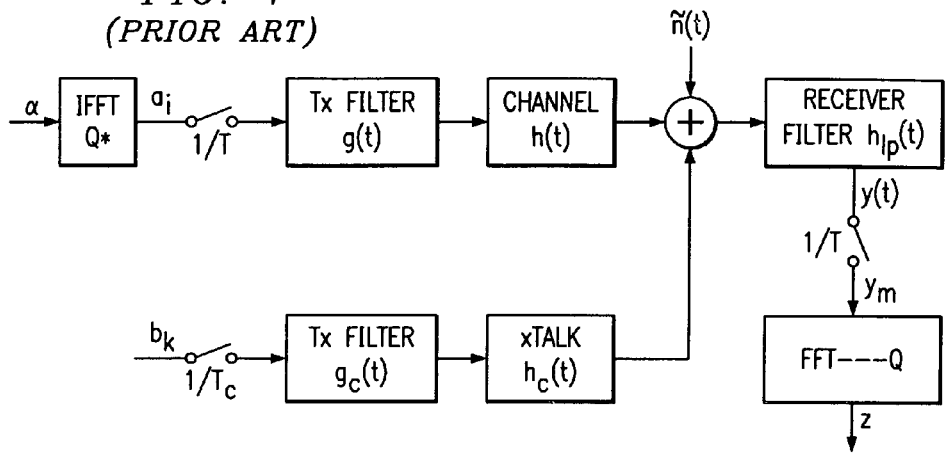
FIG. 1 diagrammatically illustrates a primary and crosstalk channel model utilized by the present invention.

These channel coupling functions are illustrated in FIG. 1. The receiver samples y(t), and the resulting discrete output is:

$$y_m = \sum_i a_i p((m-i)T) + \sum_k b_k c(mT - kT_c + \tau) + \tilde{n}_m \qquad (4)$$

Figure 1A:
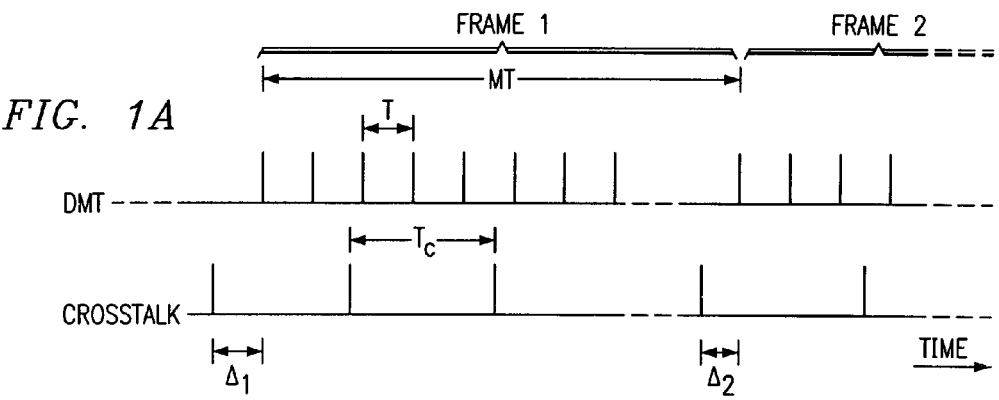
FIG. 1A graphically illustrates exemplary timing relationships between the DMT and cross talk signals of FIG. 1.

FIG. 1A illustrates an exemplary timing relationship between the DMT signal and the crosstalk signal. The DMT signal data is arranged in frames of length MT. The crosstalk symbols are generally not timewise aligned with the DMT frames, and the crosstalk symbol period $T_C$ generally differs from the sampling period T associated with the DMT data, so there is an effective crosstalk signal delay $\Delta_f$ between the beginning of a given crosstalk symbol and the beginning of the next DMT frame, where f is a DMT frame index. Because $T_C$ is generally not a multiple of T, $\Delta_f$ generally varies from frame to frame, eventually repeating itself at a time determined by the ratio $T_C/T$.

At the transmitter, a signal $\alpha$ is modulated onto the individual subchannels using, for example, an inverse FFT into the time domain for transmission. For an exemplary DMT system with M/2 subcarriers, data can be transmitted in blocks (also referred to as frames) of size M (see also FIG. 1A). At the transmitter the output of the IFFT operation is:

$$a_i = \frac{1}{\sqrt{M}} \sum_{k=0}^{M-1} \alpha_k e^{\frac{-j2\pi i k}{M}} \quad i=0, 1, \ldots M-1 \tag{5}$$

Where $$\alpha_k, k = 0, 1 \ldots \frac{M}{2} - 1,$$

is the data on the $k^{th}$ subcarrier and $$\alpha_{M-k} = \alpha_k^*, k = 1, 2, \ldots \frac{M}{2} - 1.$$

Using matrix notation, the DMT modulation can be denoted:

$$a = Q^*\alpha \tag{6}$$

where $Q^*$ is the IFFT matrix, the inverse of the FFT matrix Q, which is an M×M matrix defined as:

$$Q = \frac{1}{\sqrt{M}} \begin{pmatrix} e^{-j\frac{2\pi}{M}(M-1)(M-1)} & \cdots & e^{-j\frac{2\pi}{M}(M-1)} & 1 \\ e^{-j\frac{2\pi}{M}(M-2)(M-1)} & \cdots & e^{-j\frac{2\pi}{M}(M-2)} & 1 \\ \vdots & \vdots & \vdots & \vdots \\ e^{-j\frac{2\pi}{M}(M-1)} & \cdots & e^{-j\frac{2\pi}{M}} & 1 \\ 1 & \cdots & 1 & 1 \end{pmatrix} \tag{7}$$

Using this, the system model can be written compactly as:

$$y = Pa + Cb + \tilde{n} \tag{8}$$

where y is a vector of length M consisting of $y_m$ for m=1, 2, ... M (see also FIG. 1A), P is the M×M channel response matrix, C is the crosstalk response matrix, a is the primary data sequence vector of length M, b is the crosstalk data sequence vector, and $\tilde{n}$ is the noise sequence vector of length M.

Due to the use of a cyclic prefix ($a_{M-i}=a_{-i}$, i=1, ... v), which eliminates all inter-symbol and inter-carrier interference in DMT systems (assuming the length of the effective channel is shorter than the cyclic prefix), the matrix P becomes circular:

$$P = \begin{bmatrix} p_0 & \cdots & p_{v-1} & p_v & 0 & \cdots & 0 \\ 0 & p_0 & \cdots & p_{v-1} & p_v & \ddots & 0 \\ \vdots & \ddots & \ddots & \ddots & \ddots & \ddots & \vdots \\ 0 & \cdots & 0 & p_0 & \cdots & p_{v-1} & p_v \\ p_v & 0 & \cdots & 0 & p_0 & \cdots & p_{v-1} \\ \vdots & \ddots & \ddots & \ddots & \ddots & \ddots & \vdots \\ p_1 & \cdots & p_v & 0 & \cdots & 0 & p_0 \end{bmatrix} \tag{9}$$

where v+1 is the number of taps in the channel response when p(t) is sampled, and $p_0, p_1, \ldots p_v$ are the taps of p(t). Due to the circulant nature of P, it can be decomposed into:

$$P = Q^*\Lambda Q \tag{10}$$

where $\Lambda$ is a diagonal matrix whose diagonal elements correspond to the frequency response of the channel. C is an M×(L+μ) crosstalk response matrix denoted by:

$$C = [c_{ij}], i=1, \ldots, M; j=1, \ldots, L+\mu \tag{11}$$

where L is the number of crosstalk symbols in one DMT block (L=⌈$MT/T_c$⌉), μ+1 is the number of taps in the crosstalk response when c(t) is sampled and:

$$c_{ij} = c(\tau + (M-i)T - (L-j)T_c) \tag{12}$$

As mentioned above, the effective crosstalk signal delay $\Delta_f$ changes from block to block, because the symbol rates of the DSL and crosstalk system are in general not multiples. At the other end of the system, the receiver performs the FFT operation (demodulation) on the sampled waveform (see Equation 4) and, in matrix form:

$$\begin{aligned} z &= Qy \\ &= \Lambda\alpha + QCb + \tilde{n} \end{aligned} \tag{13}$$

where the diagonal elements of $\Lambda$ from top left to bottom right are:

$$\text{diag}(\Lambda) = Q \cdot \begin{bmatrix} 0 \\ \vdots \\ p_v \\ \vdots \\ p_0 \end{bmatrix} \tag{14}$$

The demodulated vector of Equation (13) can be written more generally as:

$$z = \Lambda\alpha + Hx + \tilde{n} \tag{15}$$

where $\Lambda$, $\alpha$ and $\tilde{n}$ are defined as before, and Hx=QCb.

The D/A conversion of the discrete crosstalk data gives a periodic spectrum. If ideal transmit filters could used in the D/A conversion process, only one period of the spectrum would be transmitted and all the other images of the spectrum would be eliminated. However, since ideal brickwall filters are not realizable (e.g. the transmit filters in HDSL and T1 technologies are typically not very strong), some of the image data in the excess band remains. Assuming that the sampling rate, 1/T, of the DSL system is higher than required for the crosstalk system, $1/T_c$, and hence the crosstalk is oversampled, this allows the DSL system to see the entire excess band of the crosstalker. With this in mind, the vectors of Equation (15) can be grouped into 2 sets:

$$\begin{bmatrix} z_2 \\ z_1 \end{bmatrix} = \begin{bmatrix} \Lambda_2 \alpha_2 \\ \Lambda_1 \alpha_1 \end{bmatrix} + \begin{bmatrix} H_2 x \\ H_1 x \end{bmatrix} + \begin{bmatrix} \tilde{n}_2 \\ \tilde{n}_1 \end{bmatrix} \qquad (16)$$

where elements subscripted by 1 denote the portions of the received waveform in the crosstalk excess band, and those subscripted by 2 denote the portions of the received waveform in the crosstalk main band. That is, subscript 1 denotes subchannels in the crosstalk excess band, and subscript 2 denotes subchannels in the crosstalk main band. The subchannel grouping into main and excess bands is based on the characteristics of the crosstalk.

Generally, the crosstalk energy will be lower in the crosstalk excess band, so the crosstalk signal in the crosstalk excess band can be treated as noise, and the DMT signal in the crosstalk excess band can be successfully demodulated without doing any crosstalk cancellation. Assuming reliable detection of the DMT signal in the excess band, that is, assuming correct demodulation of $\alpha_1$ from Equation (16) (i.e. the data on the DMT subcarriers in the crosstalk excess band), then let:

$$r = z_1 - \Lambda_1 \alpha_1 \qquad (17)$$
$$= H_1 x + \tilde{n}_1$$

The vector r represents the received crosstalk signal (plus noise) in the excess band.

Let $\hat{x}=Nr$ be a linear estimate of x, for some linear transformation N. Then the error is $(\hat{x}-x)=(Nr-x)$. The mean square error is $E[(Nr-x)*(Nr-x)]$, and the linear MMSE estimate of $\hat{x}$ is:

$$\arg \min_N E[(Nr-x)*(Nr-x)] \qquad (18)$$

The orthogonality principle can be used to solve this problem. Accordingly, the N which achieves a minimum in Equation (18) is then:

$$\overline{N} = R_x (H_1 R_x H_1^* + R_n)^{-1} \qquad (19)$$

where $R_x$ and $R_n$ are covariance matrices defined by corresponding autocorrelation functions, $$R_x = E[xx^*]$$

and $$R_n = E[\tilde{n}\tilde{n}^*].$$

This can also be shown to be equivalent to:

$$\overline{N} = (H_1^* R_n^{-1} H_1 + R_x^{-1})^{-1} H_1^* R_n^{-1} \qquad (20)$$

The estimate $\hat{x}$ would then be:

$$\hat{x} = \overline{N} r \qquad (21)$$
$$= (H_1^* R_n^{-1} H_1 + R_x^{-1})^{-1} H_1^* R_n^{-1} r$$

The estimated crosstalk in the main band would then (from Equation (16)) be:

$$X_c = H_2 \hat{x} \qquad (22)$$
$$= H_2 (H_1^* R_n^{-1} H_1 + R_x^{-1})^{-1} H_1^* R_n^{-1} r$$

Let $H_1=Q_1 C$ (where $Q_1$ is the portion of Q corresponding to the subchannels of the crosstalk excess band), and x=b. The matrix $\overline{N}$ then becomes:

$$\overline{N} = (C^* Q_1^* R_n^{-1} Q_1 C + R_b^{-1})^{-1} C^* Q_1^* R_n^{-1} \qquad (23)$$

The crosstalk data (prior to transmission) can be estimated as:

$$\hat{b} = \hat{x} = \overline{N} r = (C^* Q_1^* R_n^{-1} Q_1 C + R_b^{-1})^{-1} C^* Q^* R_n^{-1} r \qquad (24)$$

and the cancellation signal in the main band is:

$$X_c = Q_2 C \hat{b} \qquad (25)$$

(where $Q_2$ is the portion of Q corresponding to the subchannels of the crosstalk main band). Combining Equations (24) and (25), $$X_c = Q_2 C (C^* Q_1^* R_n^{-1} Q_1 C + R_b^{-1})^{-1} C^* Q_1^* R_n^{-1} r \qquad (26)$$

This solution (where $H_1=Q_1 C$ and x=b) is disclosed by Steve Chaohuang Zeng and John N. Cioffi in "Crosstalk Cancellation in xDSL Systems," TIE1.4/2001-142R0, May 2001 (hereinafter "Zeng"), incorporated herein by reference. In order to implement the algorithm in practice, knowledge of C, $R_n$ and $R_b$ must be available. As described in Zeng, we can assume $R_b=I$ and $R_n=\sigma_n^2 I$, where $\sigma_n^2$ is the variance of the background noise, which can be assumed to be white. The crosstalk cancellation signal then becomes:

$$X_c = Q_2 C (C^* Q_1^* Q_1 C + \sigma_n^2 I)^{-1} C^* Q_1^* r \qquad (27)$$

Implementing Equation (27) requires overcoming two main obstacles. First, C is a function of the effective crosstalk signal delay ($\Delta_f$), which changes from frame to frame. Thus, C must be determined for each DMT frame, and a matrix inversion must be performed for each frame, which is prohibitively complex.

Zeng proposes a solution for this first problem. If C for $\Delta_f = 0$ (denoted by $C_0$) is known, then the approximation:

$$Q_1 C \approx D_1 Q_1 C_0 \qquad (28)$$

can be made, where:

$$D_1 = \begin{bmatrix} e^{j2\pi \frac{k_1}{M} \frac{\Delta_f}{T}} & 0 & \cdots & 0 \\ 0 & e^{j2\pi \frac{k_2}{M} \frac{\Delta_f}{T}} & \ddots & \vdots \\ \vdots & \ddots & \ddots & 0 \\ 0 & \cdots & 0 & e^{j2\pi \frac{k_m}{M} \frac{\Delta_f}{T}} \end{bmatrix} \qquad (29)$$

Here $D_1$ is a phase shift matrix for the crosstalk excess band, and $k_1, \ldots, k_m$ are the tone indices in the excess band. So $X_c$ can be approximated as:

$$X_c \approx D_2 \Phi D_1^* r \quad (30)$$
$$= D_2 Q_2 C_0 (C_0^* Q_1^* Q_1 C_0 + \sigma_n^2 I)^{-1} C_0^* Q_1^* D_1^* r$$

Here $D_2$ is a phase shift matrix similar to $D_1$, but for the tones in the crosstalk main band. The matrix $\Phi$ is constant and needs to be computed only once. Using the above-described approximation from Zeng makes $X_c$ computationally feasible. However, the second problem of accurately determining the crosstalk coupling function C still remains. Misestimation of C can severely degrade performance. This in practice can be a very challenging problem to solve without coordination between ADSL modems and coordination between different DSL services (i.e. HDSL and ADSL).

A technique which does not explicitly require this coupling function, yet remains computationally feasible, would permit a more practical implementation of crosstalk mitigation. The present invention does not require explicit knowledge of the crosstalk coupling function and, as shown below, can also be computationally feasible.

To make $X_c$ blind to the crosstalk coupling C, let $H_1 = Q_1$ and $x = Cb$ in Equation (16). The matrix $\overline{N}$ thus becomes:

$$\overline{N} = (Q_1^* R_n^{-1} Q_1 + R_{Cb}^{-1})^{-1} Q_1^* R_n^{-1} \quad (31)$$

Recalling that $\hat{x} = \overline{N} r$ and $x = Cb$, $\hat{Cb}$ can be expressed as $\hat{Cb} = \overline{N} r$, so the crosstalk data and coupling function can be estimated together as:

$$\hat{Cb} = (Q_1^* R_n^{-1} Q_1 + R_{Cb}^{-1})^{-1} Q_1^* R_n^{-1} r \quad (32)$$

Thus, in contrast to the Zeng assumption that the receiver has knowledge of the crosstalk coupling function (by making $H_1 = Q_1 C$ and estimating $x = b$), the present invention does not assume that the coupling function C is known to the receiver. Rather, the invention assigns $H_1 = Q_1$ and estimates the crosstalk data and crosstalk coupling function together as $x = Cb$. The cancellation signal in the main band is then:

$$X_c = Q_2 \hat{Cb} \quad (33)$$

So, from Equations (32) and (33), $$X_c = Q_2 (Q_1^* R_n^{-1} Q_1 + R_{Cb}^{-1})^{-1} Q_1^* R_n^{-1} r \quad (34)$$

Here, the covariance matrix $R_{Cb}$ is needed, where $R_{Cb} = E\{Cb[Cb]^*\}$. Advantageously, $Cb$ is the crosstalk signal observed at the receiver. $R_{Cb}$ like $R_C$ in Zeng's solution, is a function of $\Delta_f$ and changes from frame to frame.

Some embodiments simply integrate $\Delta_f$ out of $R_{Cb}$, which converts $R_{Cb}$ from a cyclostationary matrix to a stationary matrix. In practice, the receiver side can listen during a quiet period or during a training period when a known signal is being transmitted. In either case, only the crosstalk and noise are present at the receiver (since the known signal can be subtracted). During this quiet or training period, the effective crosstalk delay $\Delta_f$ will take on values between 0 and $T_c$ (see also FIG. 1A) and, by averaging over these various values of $\Delta_f$, a stationary covariance matrix R can be obtained. As before, noise is assumed to be uncorrelated, that is $R_n = \sigma_n^2 I$. Substituting into Equation (34), the cancellation signal would then be:

$$X_c = Q_2 (Q_1^* Q_1 + \sigma_n^2 R^{-1})^{-1} Q_1^* r \quad (35)$$

Removing the dependence on $\Delta_f$ eliminates the need for a matrix inversion for each DMT block. This is amenable to practical implementation. However, by ignoring the cyclostationary behavior of $R_{Cb}$, performance can suffer.

Some embodiments retain the cyclostationary characteristics of $R_{Cb}$. Recall that, although the Zeng solution of Equation (26) requires explicit knowledge of the crosstalk coupling function, C, the present invention requires knowledge of $R_{Cb}$, as shown by Equation (34). Equations (26) and (34) are both of the general form:

$$X_c = Q_2 \Gamma Q_1^* r \quad (36)$$

where:

$$\Gamma = C(C^* Q_1^* Q_1 C + \sigma_n^2 I)^{-1} C^* \quad (37)$$

in Equation (26) and:

$$\Gamma = (Q_1^* Q_1 + \sigma_n^2 R_{Cb}^{-1})^{-1} \quad (38)$$

in Equation (34).

Evaluating Equation (37) at $\Delta_f = 0$ yields $\Gamma$ at $\Delta_f = 0$ (denoted by $\Gamma_0$), which can be substituted into Equation (30) to produce:

$$X_c = D_2 Q_2 \Gamma_0 Q_1^* D_1 r \quad (39)$$

Evaluating Equation (38) at $\Delta_f = 0$ yields:

$$\Gamma_0 = (Q_1^* Q_1 + \sigma_n^2 R_{Cb}^{-1}(0))^{-1} \quad (40)$$

Plugging $\Gamma_0$ from Equation (40) into Equation (39), $D_1$ and $D_2$ can be exploited to avoid a matrix inversion at the receiver for each DMT block, allowing the algorithm to be efficient enough to implement in practice. However, rather than having to determine the crosstalk coupling function C for $\Delta_f = 0$, $R_{Cb}$ can be evaluated for $\Delta_f = 0$ (denoted by $R_{Cb}(0)$) to achieve the same result.

Approximating $R_{Cb}(0)$ can be done fairly easily. At the receiver, the relative delay between the crosstalk symbol and the DMT frame ($\Delta_f$) can be determined exactly for each DMT frame, because T and $T_c$ (see FIG. 1A) are both known. The receiver can shift the received time-domain waveform in each DMT frame by the delay for that frame, and use the shifted waveform in the $R_{Cb}(0)$ approximation. Fractional shifting can be accomplished by simply upsampling the received waveform by some factor, shifting the appropriate amount, and then decimating by the same factor.

An initial value for $\Delta_f$ is needed in order to calculate all subsequent delays $\Delta_f$ at the receiver, and this initial value can be obtained in the following exemplary ways. In many cases, the crosstalker can be identified, for example, an HDSL crosstalker or a T1 crosstalker, etc. Such a known crosstalker has a known power spectral density (PSD) mask, so an equivalent impulse response $h_C$ can be easily determined from the crosstalker's PSD mask, $PSD_C$, as follows:

$$h_C = \text{ifft}(\sqrt{PSD_C})$$

The impulse response $h_C$ can be correlated with the received signal $y_m$, and the point in time where maximum correlation occurs can be taken as the crosstalk symbol boundary (see also FIG. 1A). The time difference between the crosstalk symbol boundary and the DMT frame boundary within the current crosstalk symbol can then be taken as the initial value for $\Delta_f$.

An alternative way of determining an initial value of $\Delta_f$ is to arbitrarily assume a boundary of the crosstalk symbol. For the assumed symbol boundary, the energy in first and last portions of the symbol (for example the first 10% and the last 10%) can be measured, and a ratio of the measured energies can be formed. If the crosstalk symbol boundary has been assumed correctly, then the aforementioned energy ratio should be independent of the crosstalk data $b_k$, while being dependent only on the crosstalk impulse response. Different crosstalk symbol boundaries can be assumed, and the aforementioned energy ratio can be obtained during two or more consecutive crosstalk symbol times for each assumed symbol boundary. An assumed boundary that produces the same energy ratio during consecutive crosstalk symbol periods can be taken to be the correct crosstalk symbol boundary. Once the crosstalk symbol boundary is determined, an initial value for $\Delta_f$ is simply the time delay until the beginning of the DMT frame within the current crosstalk symbol.

Figure 2:
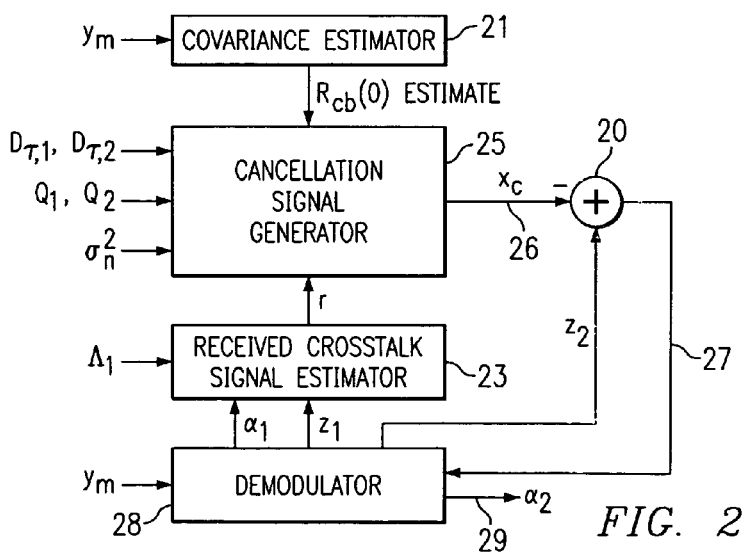
FIG. 2 diagrammatically illustrates pertinent portions of exemplary embodiments of a communication receiver according to the invention.

FIG. 2 diagrammatically illustrates pertinent portions of exemplary embodiments of a communication receiver (for example an xDSL receiver) according to the invention. The receiver of FIG. 2 includes a covariance estimator 21, a received crosstalk signal estimator 23 and a crosstalk cancellation signal generator 25. The covariance estimator 21 receives the discrete time domain signal $y_m$, and produces $R_{Cb}(0)$ in response thereto. The cancellation signal generator 25 receives $R_{Cb}(0)$ from the covariance estimator 21, and also receives the phase shift matrices $D_1$ and $D_2$, the FFT matrices $Q_1$ and $Q_2$, and $\sigma_n^2$. The cancellation signal generator 25 further receives the vector r from the received crosstalk signal estimator 23. The received crosstalk signal estimator implements Equation (17) to produce the vector r in response to $\Lambda_1$, $\alpha_1$ and $z_1$. Note that the signals $z_1$, $z_2$ and $\alpha_1$ are available from conventional demodulation operations at 28. The cancellation signal generator 25 implements Equations (39) and (40) to produce the cancellation signal at 26. This cancellation signal is then subtracted from $z_2$ at 20, and the result 27 is further processed by demodulator 28 (conventional frequency equalization) to produce at 29 the receiver's estimate of the data on the DMT subcarriers in the crosstalk main band (i.e., an estimate of $\alpha_2$ from Equation (16)).

Figure 3:
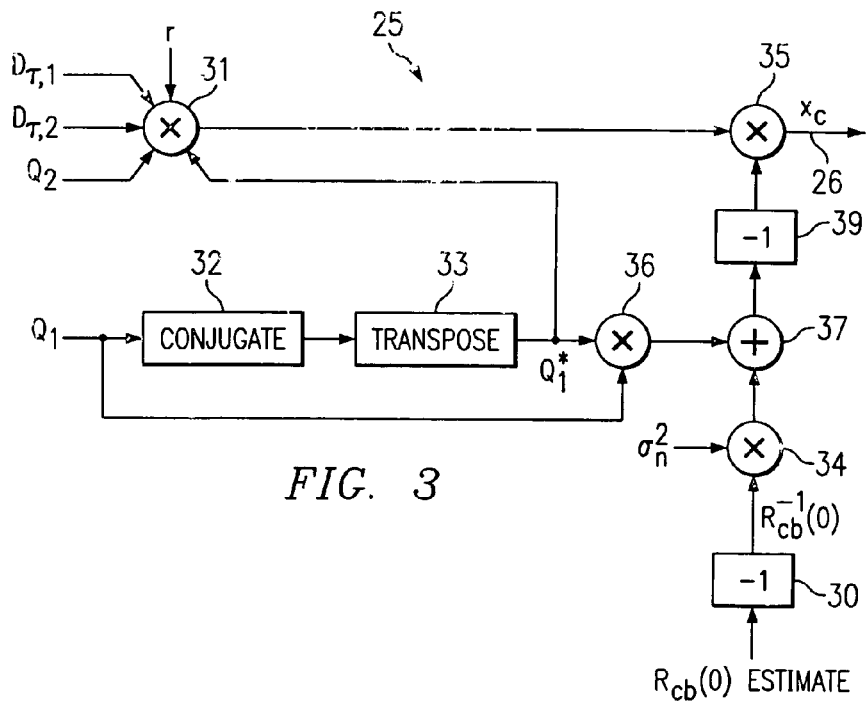
FIG. 3 diagrammatically illustrates exemplary embodiments of the cancellation signal generator of FIG. 2.

FIG. 3 diagrammatically illustrates exemplary embodiments of the cancellation signal generator of FIG. 2. In the example of FIG. 3, $Q_1$ is applied to a conjugator 32 whose output feeds a transposer 33 whose output provides $Q_1^*$. This output $Q_1^*$ is applied to a multiplier 31 along with $Q_2$, r, $D_1$ and $D_2$. The product output from multiplier 31 is input to a multiplier 35. A multiplier 36 multiplies $Q_1^*$ by $Q_1$, and the resulting product is input to an adder 37. The $R_{Cb}(0)$ estimate is applied to a matrix inverter 30, and the result $$R_{Cb}^{-1}(0)$$

is multiplied by $\sigma_n^2$ at 34. The product at 34 is input to the adder 37. The output of adder 37 is input to a matrix inverter 39 and the resulting inverted matrix is multipled at 35 by the output of multiplier 31 to produce the cancellation signal at 26.

Figure 4:
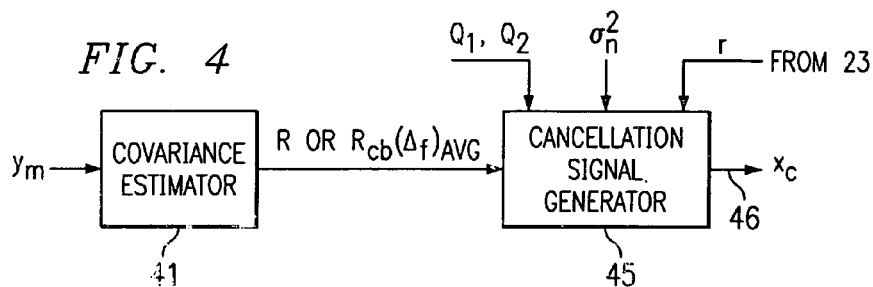
FIG. 4 diagrammatically illustrates pertinent portions of further exemplary embodiments of a communication receiver according to the invention.

FIG. 4 diagrammatically illustrates pertinent portions of further exemplary embodiments of a communication receiver (for example an xDSL receiver) according to the invention. The receiver of FIG. 4 includes a covariance estimator 41 which produces the matrix R in response to $y_m$. The matrix R is input to a cancellation signal generator 45 which also receives $Q_1$, $Q_2$, r and $\sigma_n^2$. The cancellation signal generator 45 implements Equation (35) to produce a cancellation signal 46. The cancellation signal 46 can be used to produce the desired DMT data signal in the main band in generally the same manner shown in FIG. 2.

Figure 5:
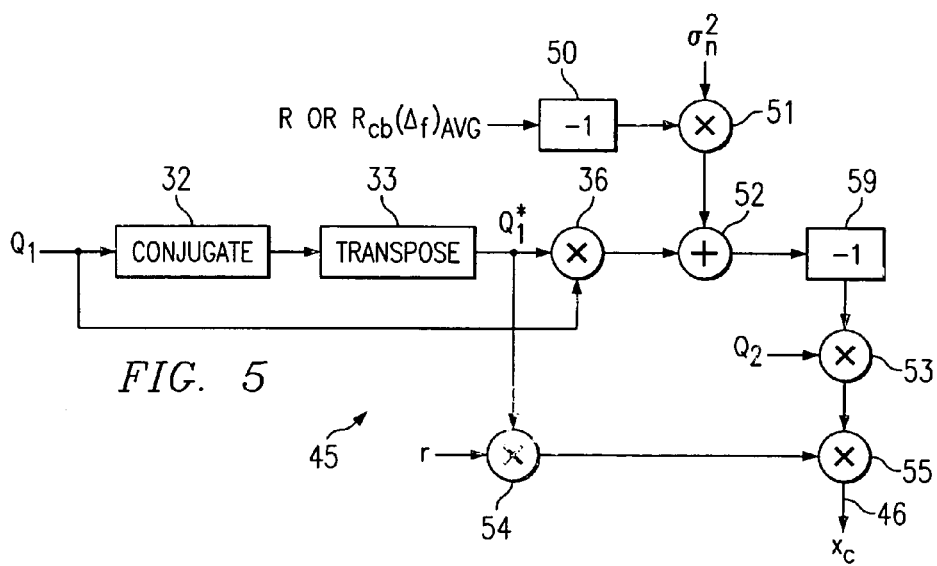
FIG. 5 diagrammatically illustrates exemplary embodiments of the cancellation signal generator of FIG. 4.

FIG. 5 diagrammatically illustrates exemplary embodiments of the cancellation signal generator 45 of FIG. 4. In the cancellation signal generator of FIG. 5, $Q_1^*$ is produced and multiplied by $Q_1$ in generally the same fashion as shown in FIG. 3. The output of multiplier 36 in FIG. 5 is input to an adder 52. A matrix inverter 50 inverts R, and the result is multiplied by $\sigma_n^2$ at 51. The product at 51 is input to adder 52. At 59, the matrix output by adder 52 is inverted, and the result is multiplied by $Q_2$ at 53. The product at 53 is input to a multiplier 55. At 54, $Q_1^*$ is multiplied by r, and the result is input to multiplier 55, whose output is the cancellation signal 46.

Figure 4A:
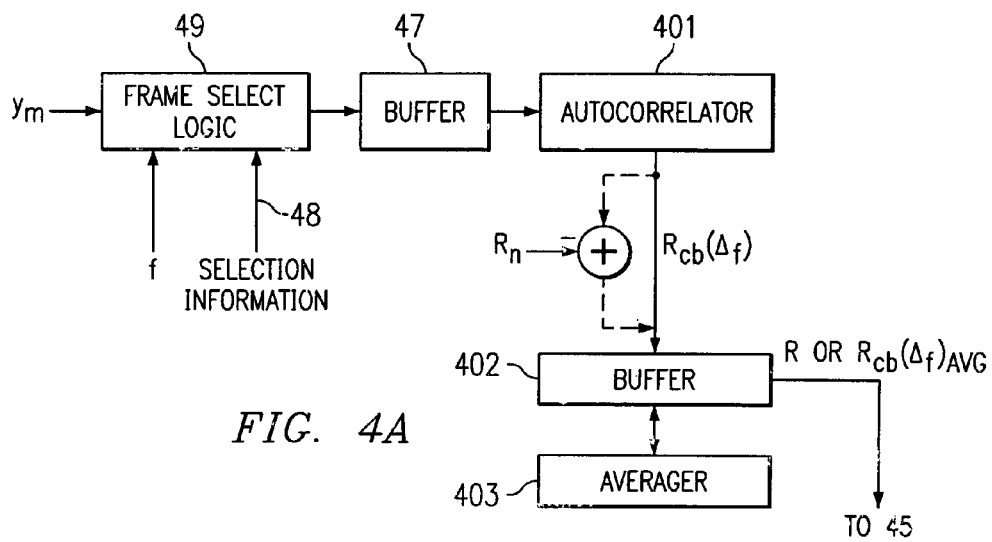
FIG. 4A diagrammatically illustrates exemplary embodiments of the covariance estimator of FIG. 4.

FIG. 4A diagrammatically illustrates exemplary embodiments of the covariance estimator 41 of FIG. 4. In FIG. 4A, frame select logic 49 is responsive to frame index f and frame selection information 48 for selecting those DMT frames that will be used to produce the aforementioned R matrix. Each DMT frame corresponds to the length M vector y of Equation (8), and thus includes M samples (see also FIG. 1A), so the selected frames can be stored in respective locations of a buffer 47 that is M samples wide. The frame selection information 48 can direct the frame select logic 49 to select desired sets of DMT frames for use in producing R. In some embodiments, all frames received during the quiet/training period are used to produce the stationary covariance matrix R. In other embodiments, subsets of all received frames are used to produce $R_{Cb}$ averages respectively corresponding to the subsets. For example, when the value of $\Delta_f$ repeats itself every sixth DMT frame (this would be known by virtue of knowing T and $T_c$), five subsets of DMT frames can be selected, wherein all frames of a given subset correspond to a respective one of the five possible values of $\Delta_f$.

Referring again to Equation (8), $$y = Cb + \tilde{n} \quad (41)$$

during a quiet/training period. Therefore, during the quiet/training period, $R_{Cb}$ is given by $$E[yy^*] = E[(Cb + \tilde{n})(Cb + \tilde{n})^*] = E[CbCb^*] + 2E[Cb\tilde{n}^*] + E[\tilde{n}\tilde{n}^*]. \quad (42)$$

(42)

Noise and crosstalk can be safely assumed to be uncorrelated, so $E[Cb\tilde{n}^*]=0$. The noise can be expected to be negligible compared to the crosstalk, so Equation (42) shows that the autocorrelation function $E[yy^*]$ gives a good approximation of $R_{Cb}$ for a given value of $\Delta_f$, designated by $R_{Cb}(\Delta_f)$. The matrix $R_{Cb}(\Delta_f)$ for each frame stored in buffer 47 is thus produced by the autocorrelator 401. Because the buffered DMT frames are vectors of length M, $R_{Cb}(\Delta_f)$ is an M×M matrix.

The $R_{Cb}(\Delta_f)$ matrices are buffered at 402. An averager 403 can then produce an $R_{Cb}(\Delta_f)$ average matrix for each subset of frames (i.e., an average $R_{Cb}(\Delta_1)$ matrix for frames corresponding to $\Delta_1$, an average $R_{Cb}(\Delta_2)$ matrix for frames corresponding to $\Delta_2$, etc.). In some embodiments, the averager can also produce an overall average (corresponding to the aforementioned R matrix) by averaging the aforementioned $R_{Cb}(\Delta_f)$ average matrices. In other embodiments, all $R_{Cb}(\Delta_f)$ matrices produced at 401 can be directly averaged together at once to produce R.

The $R_{Cb}(\Delta_f)$ average matrices, designated by $R_{Cb}(\Delta_f)_{AVG}$, and/or the R matrix can be stored in buffer 402 for use by the cancellation generator 45 of FIG. 4. In some embodiments, R is used at 45 in FIG. 4 for all frames. In other embodiments, the $R_{Cb}(\Delta_f)_{AVG}$ matrices are used at 45 in conjunction with the DMT frames to which they correspond.

Some embodiments take advantage of situations wherein crosstalk is absent during a quiet/training period (i.e., y=ñ), and calculate $R_n=E[ññ^*]$, which can later be subtracted from $R_{Cb}(\Delta_f)$ for a more accurate estimate of $R_{Cb}(\Delta_f)$, as shown by broken line in FIG. 4A.

Figure 2A:
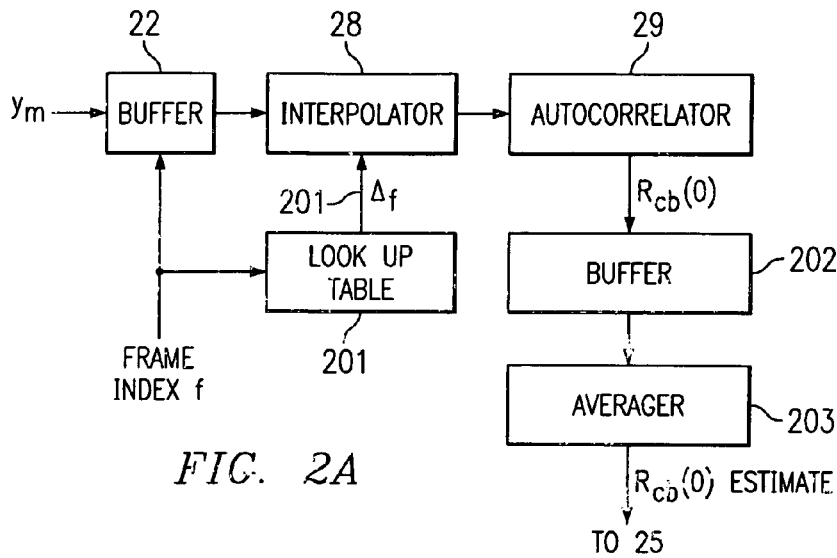
FIG. 2A diagrammatically illustrates exemplary embodiments of the covariance estimator of FIG. 2.

FIG. 2A diagrammatically illustrates exemplary embodiments of the covariance estimator 21 of FIG. 2. During a quiet/training period, a buffer 22 stores the samples of the current DMT frame, plus at least the first sample of the next DMT frame and the last sample of the previous DMT frame. An interpolator 28 receives at 200 information indicative of $\Delta_f$ for the current frame. In some embodiments, the values of $\Delta_f$ are stored in a look-up table 201, and the frame index f is used to access the look-up table. The frame index f is also provided to the buffer 22, thereby permitting the buffer 22 to update its contents with each new frame arrival.

Using conventional interpolation techniques, the interpolator 28 interpolates appropriately between the samples of the received frames to implement a time shift equal to the value of $\Delta_f$ received from the look-up table 201. An autocorrelator 29 receives the time-shifted signal from interpolator 28, and produces the $R_{Cb}$ matrix for the current frame. Because of the time shift implemented by the interpolator, the autocorrelator 29 actually produces an $R_{Cb}(0)$ matrix corresponding to each of the various values of $\Delta_f$. These individual $R_{Cb}(0)$ matrices can be stored in buffer 202 and ultimately applied to an averager 203 which averages all of the matrices to produce an estimate of $R_{Cb}(0)$ for use by the cancellation signal generator 25 of FIG. 2.

Figure 6:
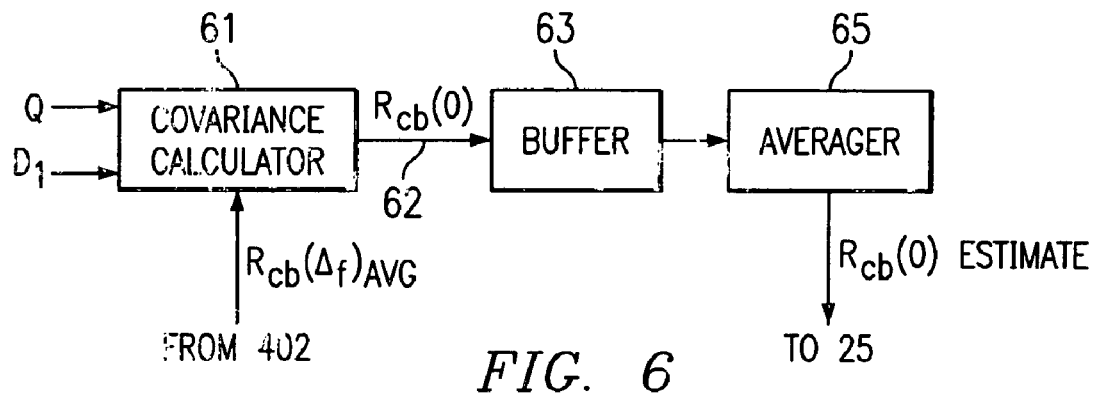
FIGS. 6 and 6A diagrammatically illustrate further exemplary embodiments of the covariance estimator of FIG. 2.

FIG. 6 diagrammatically illustrates further exemplary embodiments of the covariance estimator of FIG. 2. During quiet/training periods $$z=Qy=QCb+ñ. \quad (43)$$

Combining Equations (28) and (43), $$z=DQC_0b+ñ \quad (44)$$

so, $$E[zz^*]=DQR_{Cb}(0)Q^*D^*+R_n. \quad (45)$$

From Equation (13) above, $E[zz^*]$ can also be expressed as $$E[zz^*]=QE[yy^*]Q^*. \quad (46)$$

Recall from the foregoing discussion relative to FIG. 4A that $$E[yy^*]\approx R_{Cb}(\Delta_f)f=1,2, \quad (47)$$

Equations (45)–(47) can be combined (neglecting $R_n$) as follows:

$$QR_{Cb}(\Delta_f)Q^*=DQR_{Cb}(0)Q^*D^* \quad (48)$$

so $R_{Cb}(0)$ can be written as follows:

$$R_{Cb}(0)=Q^*D^*QR_{Cb}(\Delta_f)Q^*DQ. \quad (49)$$

The covariance estimator of FIG. 6 includes a covariance calculator 61 which receives the $R_{Cb}(\Delta_f)_{AVG}$ matrices from the buffer 402 of FIG. 4A. For each $R_{Cb}(\Delta_f)_{AVG}$ matrix stored in buffer 402, the covariance calculator 61 calculates a corresponding $R_{Cb}(0)$ matrix by implementing Equation (49) with $R_{Cb}(\Delta_f)=R_{Cb}(\Delta_f)_{AVG}$. The resulting $R_{Cb}(0)$ matrices at 62 are stored in buffer 63 and are ultimately averaged together by averager 65 to produce an $R_{Cb}(0)$ estimate for use by the cancellation signal generator 25 of FIG. 2.

Figure 6A:
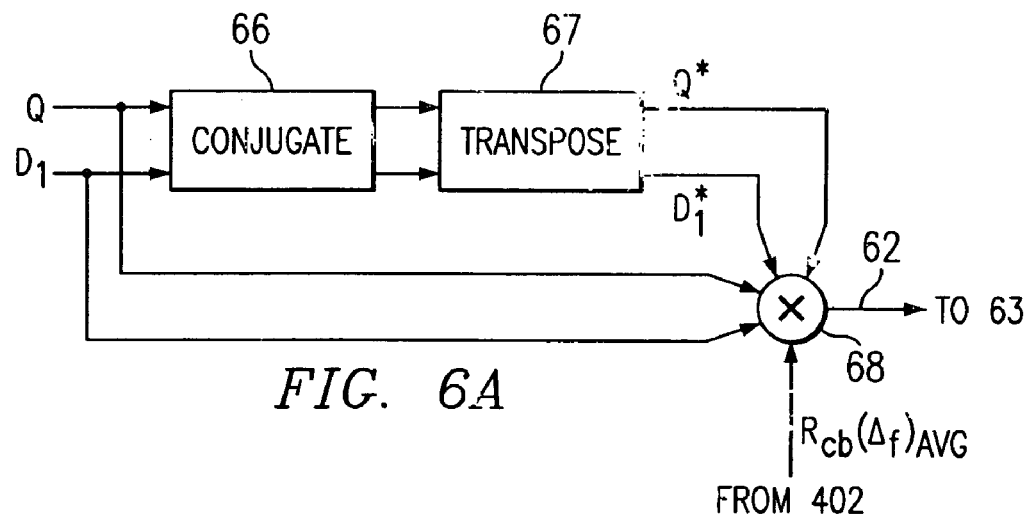

FIG. 6A diagrammatically illustrates exemplary embodiments of the covariance calculator 61 of FIG. 6. As shown in FIG. 6A, a conjugator 66 and a transposer 67 are used to produce the $Q^*$ and $D_1^*$ matrices. These matrices, along with the corresponding $D_1$ and $Q$ matrices, are multiplied at 68 together with the $R_{Cb}(\Delta_f)_{AVG}$ matrices from buffer 402 to produce corresponding $R_{Cb}(0)$ matrices for storage in buffer 63.

As will be evident to workers in the art, the embodiments of FIGS. 2–6A can be implemented, for example, by suitably modifying software, hardware, or a combination of software and hardware in conventional communication receivers, for example DMT receivers.

Although exemplary embodiments of the invention are described above in detail, this does not limit the scope of the invention, which can be practiced in a variety of embodiments.

What is claimed is:

1. A method for canceling crosstalk in a communication signal, comprising:
receiving a composite communication signal which includes a primary signal component produced by applying modulation and a channel coupling function to communication data, and which also includes a crosstalk signal component produced by applying a crosstalk coupling function to crosstalk data;
obtaining from the composite communication signal an estimate of a covariant statistical characteristic of said crosstalk signal component;
producing a plurality of covariance matrices associated with said crosstalk signal component;
averaging respective groups of said plurality of covariance matrices together to produce a plurality of respectively corresponding average covariance matrices;
generating a cancellation signal based on said plurality of respectively corresponding average covariance matrices; and
producing an estimate of the communication data based on the composite communication signal and the cancellation signal.

2. The method of claim 1, wherein said statistical characteristic is covariance, and wherein said obtaining step includes producing a covariance matrix associated with the crosstalk signal component.

3. The method of claim 1, wherein said obtaining step includes time-shifting the composite communication signal.

4. The method of claim 3, wherein said time-shifting step includes time-shifting the composite communication signal to compensate for a time offset between the primary signal component and the crosstalk signal component.

5. The method of claim 4, wherein the composite communication signal is a sampled signal, and wherein said time-shifting step includes interpolating between samples of the composite communication signal.

6. The method of claim 2, wherein said matrix producing step includes producing a plurality of covariance matrices associated with the crosstalk signal component.

7. The method of claim 6, wherein said obtaining step includes averaging the covariance matrices together to produce a corresponding average covariance matrix.

8. The method of claim 1, wherein said averaging respective groups of said covariance matrices together to produce respectively corresponding average covariance matrices further comprising obtaining a stationary covariance matrix and wherein generating said cancellation signal is based on said stationary covariance matrix.

9. The method of claim 1, wherein the composite communication signal is a sampled signal, and wherein said matrices producing step includes producing said plurality of matrices in response to respective sets of timewise consecutive samples within the composite communication signal.

10. The method of claim 9, wherein said matrices producing step includes, for each set of samples, performing an autocorrelation operation on the samples thereof.

11. The method of claim 9, wherein said obtaining step includes averaging respective groups of said covariance matrices together to produce respectively corresponding average covariance matrices.

12. The method of claim 11, wherein said matrices producing step includes producing the matrices of each said group in response to respective sets of timewise consecutive samples that form a sequence of sample sets within the composite communication signal, and wherein all adjacent pairs of sample sets within the sequence are separated from one another by a common amount.

13. The method of claim 9, wherein the sample sets are in timewise non-overlapping relationship with one another.

14. The method of claim 1, wherein said generating step includes estimating the crosstalk signal component, and generating the cancellation signal based on said plurality of respectively corresronding average covariance matrices and the estimated crosstalk signal component.

15. The method of claim 14, wherein said producing step includes performing a demodulation operation on the composite communication signal and combining the cancellation signal with a result of the demodulation operation.

16. The method of claim 1, wherein said producing step includes performing a demodulation operation on the composite communication signal and combining the cancellation signal with a result of the demodulation operation.

17. The method of claim 16, wherein said combining step includes subtracting the cancellation signal from the result of the demodulation operation.

18. The method of claim 1, wherein said modulation includes multicarrier modulation.

19. An apparatus for canceling crosstalk in a communication signal, comprising:
an input for receiving a composite communication signal which includes a primary signal component produced by applying modulation and a channel coupling function to communication data, and which also includes a crosstalk signal component produced by applying a crosstalk coupling function to crosstalk data;
a covariant statistical characteristic estimator coupled to said input for obtaining from the composite communication signal an estimate of a covariant statistical characteristic of said crosstalk signal component, said covariant statistical characteristic estimator further comprising:
an autocorrelator for producing a plurality of covariance matrices associated with the crosstalk signal component; and
an averager for averaging respective groups of said plurality of covariance matrices together to produce a plurality of respectively corresponding average covariance matrices;
a cancellation signal generator coupled to said covariant statistical characteristic estimator for generating a cancellation signal based on said plurality of respectively corresponding average covariance matrices; and
a communication data estimator coupled to said input and said cancellation signal generator for producing an estimate of the communication data based on the composite communication signal and the cancellation signal.

20. The apparatus of claim 19, wherein said statistical characteristic is covariance, and wherein said statistical characteristic estimator includes an autocorrelator for producing a covariance matrix associated with the crosstalk signal component.

21. The apparatus of claim 19, wherein said statistical characteristic estimator includes a time-shifter connected between said input and said autocorrelator for time-shifting the composite communication signal to compensate for a time offset between the primary signal component and the crosstalk signal component.

22. The apparatus of claim 21, wherein the composite communication signal is a sampled signal, and wherein said time-shifter includes an interpolator for interpolating between samples of the composite communication signal.

23. The apparatus of claim 19, including a crosstalk signal estimator coupled to said input and operable for estimating the crosstalk signal component, said cancellation signal generator coupled to said crosstalk signal estimator for generating the cancellation signal based on said plurality of respectively corresponding average covariance matrices and the estimated crosstalk signal component.

24. The apparatus of claim 23, wherein said communication data estimator includes a demodulator for performing a demodulation operation on the composite communication signal, said communication data estimator also including a combiner coupled to said demodulator and said cancellation signal generator for combining the cancellation signal with a result of the demodulation operation.

25. The apparatus of claim 19, wherein said communication data estimator includes a demodulator for performing a demodulation operation on the composite communication signal, said communication data estimator also including a combiner coupled to said demodulator and said cancellation signal generator for combining the cancellation signal with a result of the demodulation operation.

26. The apparatus of claim 25, wherein said combiner includes a subtractor for subtracting the cancellation signal from the result of the demodulation operation.

27. A communication receiver apparatus, comprising;
an input signal processing portion for obtaining from a communication channel a composite communication signal which includes a primary signal component produced by applying modulation and a channel coupling function to communication data, and which also includes a crosstalk signal component produced by applying a crosstalk coupling function to crosstalk data; and
a crosstalk canceller having an input coupled to said input signal processing portion for receiving said composite communication signal, said crosstalk canceller including a covariant statistical characteristic estimator coupled to said input for obtaining from the composite communication signal an estimate of a covariant statistical characteristic of said crosstalk signal component, said covariant statistical characteristic estimator having an autocorrelator for producing a plurality of covariance matrices associated with the crosstalk signal component; and an averager for averaging resrective groups of said plurality of covariance matrices together to produce a plurality of resrectively corresponding average covariance matrices, a cancellation signal generator coupled to said covariant statistical characteristic estimator for generating a cancellation signal based on said covariant statistical characteristic estimate, and a communication data estimator coupled to said input and said cancellation signal generator for producing an estimate of the communication data based on the composite communication signal and the cancellation signal.

28. The apparatus of claim 27, wherein said modulation includes multicarrier modulation, and wherein said communication receiver apparatus includes a multicarrier modulation receiver.

29. The apparatus of claim 28, wherein said multicarrier modulation receiver is a DMT receiver.

30. The apparatus of claim 27, wherein said input signal processing portion includes a filter for receiving signals from the communication channel, and a sampler coupled to said filter for receiving an output of said filter, and wherein said composite communication signal is a sampled signal produced by said sampler.

* * * * *